United States Patent [19]

Tomosada et al.

[11] Patent Number: 4,875,704
[45] Date of Patent: Oct. 24, 1989

[54] FRONT WHEEL SUSPENSION STABILIZER MOUNTING STRUCTURE

[75] Inventors: Kenji Tomosada, Higashihiroshima; Toshiro Kondo, Hatsukaichi; Tadanobu Yamamoto, Higashihiroshima; Hiroshi Hashino, Hiroshima, all of Japan

[73] Assignee: Mazda Motor Corporation, Hiroshima, Japan

[21] Appl. No.: 181,614

[22] Filed: Apr. 13, 1988

[30] Foreign Application Priority Data

Apr. 13, 1987 [JP] Japan .................................. 62-91499

[51] Int. Cl.[4] ...................... G60G 11/50; B62D 21/11
[52] U.S. Cl. .................................... 280/695; 280/788
[58] Field of Search ............... 280/689, 788, 664, 665, 280/666, 690, 669, 721, 723, 691, 697

[56] References Cited

U.S. PATENT DOCUMENTS 2,561,548 7/1951 Wharam et al. .................... 280/695
4,402,258 8/1977 Cislo .................................... 280/695
4,570,968 2/1986 Mukai et al. ....................... 280/664

FOREIGN PATENT DOCUMENTS 124464 7/1984 Japan .................................. 280/788
60311 3/1986 Japan .................................. 280/721

Primary Examiner—David M. Mitchell
Assistant Examiner—Karin Tyson
Attorney, Agent, or Firm—Fleit, Jacobson, Cohn, Price, Holman & Stern

[57] ABSTRACT

A front wheel suspension comprising left and right suspension arm disposed front side frames and steering knuckles of a car body and a stabilizer bar of which outer bar ends bent forth are fastened to outer sides of the left and right suspension arms so as to allow left and right wheel independently to move up and down. The left and right suspension arms are pivoted to gussets each of which is fastened to the side frame member and a reinforcement member so as to form at its rear end a space between the side frame and reinforcement members. The stabilizer bar extends transversely over the upper surface of the gusset through the space.

17 Claims, 2 Drawing Sheets

FRONT WHEEL SUSPENSION STABILIZER MOUNTING STRUCTURE

BACKGROUND OF THE INVENTION

The present invention relates to a front wheel suspension for a vehicle.

There are many known strut type front wheel suspensions in which a stabilizer bar passes across frames of a car body and is fastened at its outer bar ends to upper surfaces of lower control arms disposed on opposite sides of the car body which lower control arms are fastened to the frames of the car body by means of gusset members. The outer bar ends of the stabilizer bar are bent around and back, allowing the torsion bar section of the stabilizer bar to extend transversely from one side frame to the other side frame of the car body passing under the lower control arms, in particular between front and rear bushings of the lower control arms. The torsion bar section of the stabilizer bar is secured to the back sides of the lower control arms by means of brackets. One such strut type front wheel suspension is disclosed in, for example, Japanese Patent Unexamined Publication No. 61-60,311, entitled "SUSPENSION FOR A VEHICLE", laid open Mar. 28, 1986.

A stabilizer bar incorporated in the front wheel suspension taught by the above Japanese Patent Unexamined Publication is so constructed as to extend transversely across under the lower control arms and, in particular between front and rear rubber bushings used for the lower control arms. This stabilizer bar is constructed in an attempt not only at shortening the bar ends extending lengthwise but at making the stabilizer bar itself thinner.

Meanwhile, there is a requirement in connection with the front wheel suspension with a stabilizer bar extending between the lower control arms that, for the purpose of independency of the lower control arms from the stabilizer bar, the stabilizer bar is to be located as low as possible under the lower control arms. Because the location of the stabilizer bar is one of various factors on which the load clearance of vehicle depends, if a stabilizer bar is located at a higher position, various constructional elements of the car body need to be located at relatively higher positions.

The outer ends of the stabilizer bar of the known front wheel suspension constructed as above, which are bent around the lower control arms and downwardly back and, thereby, have a complicated curved configuration, is unavoidably subjected to a concentrated stress caused by a load applied from the lower control arms. In addition to this dynamical problem, it is hard to make the stabilizer bar thinner because of a long stabilizer bar of the above known front wheel suspension.

OBJECT OF THE INVENTION

It is, therefore, an object of the present invention to provide a front wheel suspension that uses a short, and hence thinner and lighter, stabilizer bar.

SUMMARY OF THE INVENTION

The above object of the invention is accomplished by providing a front wheel suspension in which left and right front side frames mount gusset members for pivoting left and right suspension arms, respectively and have rear lower ends bent and raised up so as to form spaces in cooperation with upper surfaces of the gusset members and reinforcements of the front car body. A stabilizer bar, which is fastened at its outer ends bent forth to the left and right suspension arms, extends through the spaces formed over the suspension arms.

A particular feature of the invention resides in the provision of the spaces formed between the front side frames and gusset members which eliminates the necessity of bending the outer ends of the stabilizer bar downwardly around the suspension arms. The spaces make it possible to arrange a stabilizer bar crossing over upper surfaces of the suspension arms, thereby neither to restrict the load clearance of car body by a stabilizer bar itself nor to use a complicated shape of stabilizer bar. In addition to these constructional advantages, stabilizer bars can be designed to take various, more simple shapes, resulting in the provision of a short length of stabilizer bar enabling it to be more thinner and light in weight.

BRIEF DESCRIPTION OF THE DRAWINGS

The above and other objects and features of the present invention will become apparent from the following detailed description of preferred embodiments thereof with reference to the accompanying drawings, in which.

DETAILED DESCRIPTION OF THE INVENTION

Figure 1:
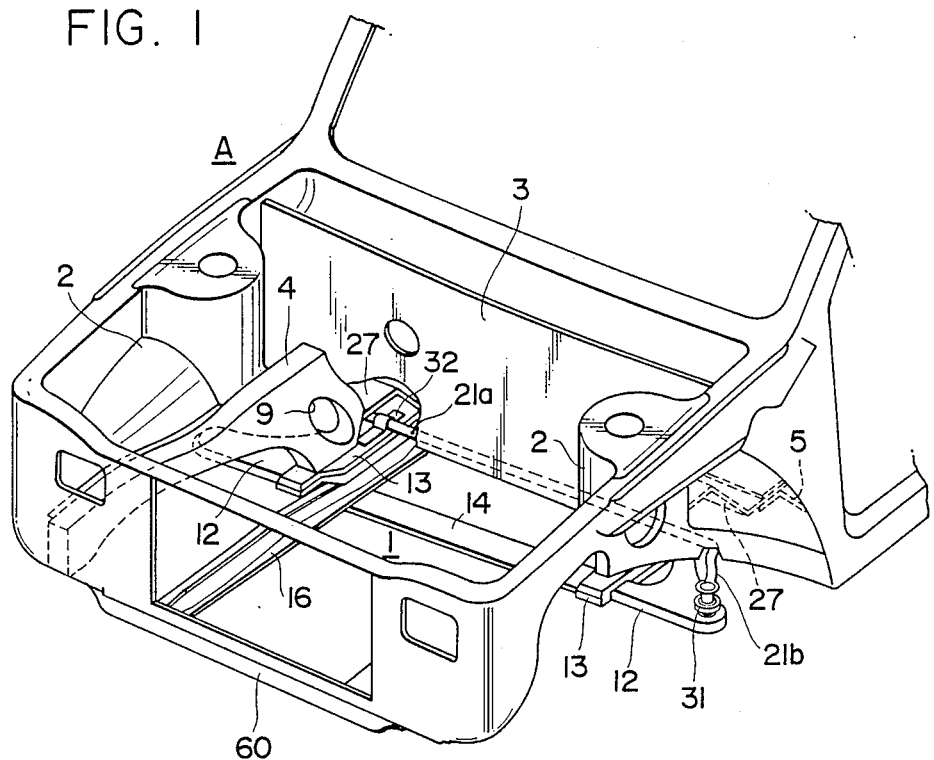
FIG. 1 is a schematic perspective view, partly in cross section, of a front body section showing a front wheel suspension constructed in accordance with the present invention.

Because front wheel suspensions are well known in the art, the present description will be directed in particular to elements forming part of, or cooperating directly with, apparatus in accordance with the present invention. It is to be understood that elements not specifically shown or described herein can take various forms well known to those skilled in the vehicle art. It is to be noted that left and right parts of the front wheel suspension are constructed in symmetry and, therefore, same elements for the left and right parts are designated by same reference numerals throughout the accompanying drawings.

Referring now to FIG. 1 shown therein is a front body section A of a vehicle wherein the front wheel suspension according to the present invention is incorporated. As shown, an engine room 1 is formed by left and right wheel housing 2 as side walls disposed on opposite sides of the front body section A and a lower dash board 3 as a partition wall between the engine room 1 and a driver's compartment (not shown). Under each wheel housing 2 (left side wheel housing 2 is hidden in this figure) there is a front side frame 4 extending lengthwise and welded to a lower periphery of the wheel housing 2 at various points. Under a floor panel (not shown) of the driver's compartment there is a longitudinal floor side frame 5 disposed on each side of car body. This floor side frame 5 is connected to a reinforcement member 27 which will be described later.

Formed in the front side frame 4 is a through hole 9 for a tie rod 37 of a steering system well known in the art.

A stabilizer bar 21 made of spring steel passes across over left and right lower control arms 12 and under rear ends of the front side frames 4. The outer bar ends 21a which are bent forth are connected to the left and right lower control arms 12 through short linkage 31, respectively.

Figure 4:
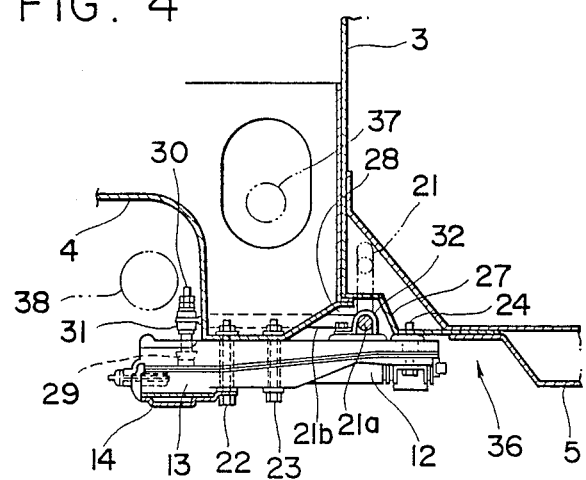
FIG. 4 is a side view of the right side front wheel suspension constructed in accordance with the present invention.
Figure 2:
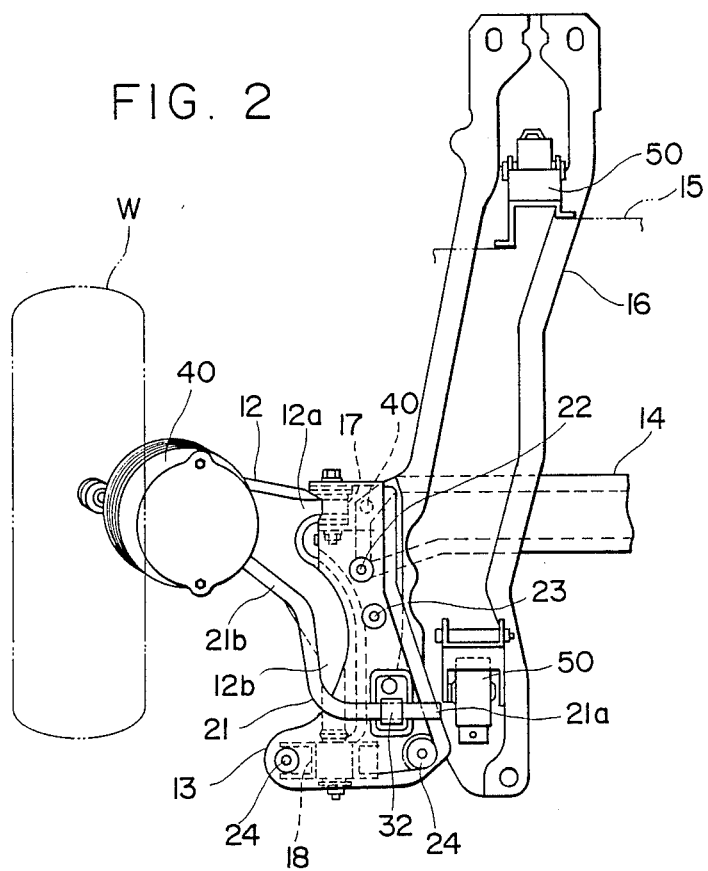
FIG. 2 is a plan view of the left side front wheel suspension constructed in accordance with the present invention.
Figure 3:
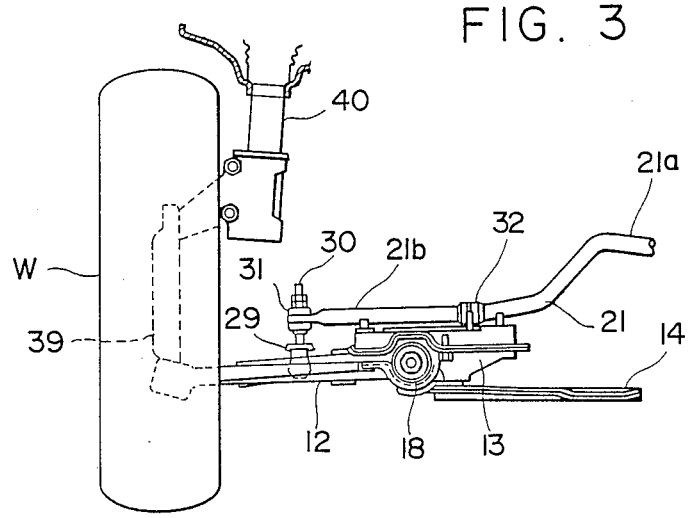
FIG. 3 is a rear view of the left side front wheel suspension of FIG. 2.

Referring now to FIGS. 2 to 4, there is shown in detail left side part of the front wheel suspension of a preferred embodiment of the present invention. As shown, in particular, in FIG. 2, the front wheel suspension includes the lower control arm 12 by which a front wheel W is free to move up and down with a minimum (least attainable) effect on the other or right side wheel. The lower control arm 12 is pivoted at its inner ends to a gusset 13 fastened to the front side frame 4 at its front and middle connection points 22 and 23 and at its rear connection points 24 at reinforcing member 27 (See FIGS. 1 and 4). The left side gusset 13 is connected to a right side gusset 13 (see FIG. 4) used for the right side wheel by means of a cross beam 14. Disposed across the cross beam 14 is an engine mounting frame 16 which mounts an engine 15 (partly shown by a double dotted line in FIG. 2) thereon through engine mountings 50. This engine mounting frame 16 extends lengthwise from a front cross member 60 to the lower dash board 3 as the partition between the engine room 1 and the driver's compartment and fixed at its rear end to the lower dash board 3.

The lower control arm 12, which is generally in the form of a forked A-shaped arm as is clearly seen in FIG. 2, has a short front arm 12a and a long rear arm 12b extending inwardly back. The front and rear arms 12a and 12b of the control arm 12 are pivoted to the gusset 13 through rubber bushings 17 and 18, respectively. Linked to the lower control arms 12 at its outer end is an outer bar end 21b of the stabilizer bar 21 extending from one side to the other of the front car body.

Each of the left and right gussets 13 is bolted at front and middle connecting points 22 and 23 to the under surface of the front side member 4 which has a generally U-shaped cross section and extends between the front cross member 60 and the lower dash board 3, and at two rear connecting points 24 to the under surface of the reinforcement member 27 which has a generally L-shaped cross section and transversely extends either entirely or partly over the width of the lower part of the lower dash board 3. Between the middle and rear connecting points 23 and 24, the front side frame 4 is formed integrally with a rear flap 4a inclined at an angle rearwardly upwardly. As is clearly seen in FIG. 4, owing to the provision of the rear flap 4a, a space 28 having a substantially trapezoidal cross section is defined by the gusset 13, the rear flap 4a of the front side frame 4 and the generally L-shaped reinforcement member 27 so as to allow a torsion bar section 21a of the stabilizer bar 21 to extend straight therethrough.

The stabilizer bar 21, as is previously described, comprises the torsion bar section 21a extending straight across the left and right front side frames 4 and outer bar ends 21b bent forth. Each outer bar end 21b of the stabilizer bar 21 is fastened to the lower control arm 12 by means of the short linkage 31 through an upper elastic member 31. This short linkage 31 is mounted on an outer end of the lower control arm 12 through a lower elastic member 29. The torsion bar section 21a is held by means of a bracket 32 fastened to the upper surfaces of the gussets 13 within the spaces 28 for twisting motion.

The cross member 14, in this embodiment, is bolted at 40 to the front end of the gusset 13 and connected to the front side members 4 at the front connection point 22 together with the gussets 13. The engine mounting member 16 is connected at its rear outer end to the gusset 13 through an elastic member. As is clearly seen in FIG. 4, there is an open space 36 between the gusset 13 and the floor side frame 5 under the floor panel of the car body for allowing the lengthwise movement of the gusset 13 relative to the floor side frame 5 upon a frontal crash of the vehicle.

As is shown in FIG. 3, the lower control arm 12 is attached at its outer end to a steering knuckle arm 39 mounted on a strut 40. Shown by a double dotted line in FIG. 4 is an axle shaft 38 for the front wheels.

The front wheel suspension constructed as above can be easily assembled and fitted to a car body. That is to say, it becomes quite easy to sub-assemble various elements such as the left and right gussets 13, the lower control arms 12, the cross member 14, the engine mounting member 16, the knuckle arms 39 mounted on the struts 40, and the stabilizer bar 21, with their associated elements, as one unit of front suspension. Therefore, the front suspension can be installed at once into the front body from underside and fastened to the front body at necessary points.

In the front wheel suspension thus constructed and installed into the front body, the stabilizer bar 21 is not needed to be bent around so as to pass over the under sides of the gussets but is allowed to extend over the left and right lower control arms 12 and the gussets 13. Owing to the arrangement of the stabilizer bar 21 over the gussets, not only the load clearance of the vehicle becomes independent of the stabilizer bar 21 but there is large room for various elements to be located under the front body.

Although the present invention has been described with reference to a preferred embodiment thereof in conjunction with accompanying drawings, it is to be noted that various changes and modifications are apparent to those skilled in the art. Therefore, unless otherwise such changes and modifications depart from the scope of the present invention, they should be construed as included therein.

What is claimed is:

1. A front wheel suspension on a front car body comprising left and right suspension arms which are connected by a stabilizer bar so as to transmit twisting force caused by either one of said suspension arms to the other suspension arm, said front wheel suspension further comprising:

left and right supporting means connected to respective one ends of said left and right suspension arms for rotatably supporting left and right front wheels, respectively;

left and right coupling means fastened to an under surface of a frame member of the front car body for pivotally mounting said left and right suspension arms through pivot means connected between the coupling means and the suspension arms; and said stabilizer bar of which outer bar ends are bent forwardly and fastened to said left and right suspension arms, respectively, extending over an upper surface of each said coupling means and passing through spaces formed between said coupling means and an upwardly bent part of said frame member of front car body.

2. A front wheel suspension as defined in claim 1, said forwardly bent ends of said stabilizer bars are fastened to said left and right suspension arms through vertical short linkages, respectively.

3. A front wheel suspension as defined in claim 2, wherein said stabilizer bar is held on said upper surface of said coupling means by brackets so as to be twistable between said outer bar ends thereof.

4. A front wheel suspension as defined in claim 1, wherein said coupling means comprises left and right gussets which are fastened to left and right front side frame members of front car body.

5. A front wheel suspension as defined in claim 4, wherein said gusset is bolted to said front side frame member of front car body.

6. A front wheel suspension arm as defined in claim 4, wherein said suspension arm is in the form of a forked A-shaped arm of which front and rear branched arms are pivoted by said pivot means.

7. A front wheel suspension as defined in claim 4, wherein said left and right gussets are connected by means of a cross member.

8. A front wheel suspension as defined in claim 7, wherein said cross member is bolted to said left and right gussets.

9. A front wheel suspension as defined in claim 1, wherein said coupling member is bolted to a front side member and a reinforcement of front car body.

10. A front wheel suspension which connects and allows left and right front wheels independently to move up or down, said front wheel suspension comprising:

left and right swingable arms for supporting said left and right front wheels for up and down movement;

left and right gussets fastened to under surfaces of left and right front side members of front car body so as to form spaces between upper surfaces thereof and said left and right front side members, said left and right gussets pivotally mounting said left and right swingable suspension arms through pivot means connected between the arms and the gussets, respectively; and a stabilizer bar for transmitting twisting force caused by either one of said left and right suspension arms to the other, said stabilizer bar comprising outer bar ends which are bent forwardly and connected to outer sides of said left and right swingable arms and a torsion bar section which extends over said upper surfaces of said left and right gussets through said spaces and is held by brackets fastened to said left and right gussets for twisting action.

11. A front wheel suspension as defined in claim 10, further comprising a cross member connecting said left and right gussets.

12. A front wheel suspension as defined in claim 11, further comprising an engine mounting member extending lengthwise of the front car body.

13. A lower surface of front wheel suspension as defined in claim 12, wherein said engine mounting member intersects said cross member.

14. A front wheel suspension comprising left and right suspension arms connected between a front side member of a car body and steering knuckles and stabilizer bar of which outer ends are fastened to outer ends the left and right suspension arms so as to allow left and right front wheels independently to move up and down, said front wheel suspension further comprising:

left and right gussets fastened to an under surface of said front side member of the car body for pivoting ends of said left and right suspension arms, respectively through pivot means connected between the gussets and the suspension arms; and a space defined between an upper surface of each of said left and right gussets and a lower surface of said front side member through which space said stabilizer bar extends crossing over said left and right gussets.

15. A front wheel suspension as defined in claim 14, wherein a rear extension of said front side member and a reinforcement disposed between a lower dash panel formed as a partition between an engine room and a driver's compartment of car body and a side frame disposed under a floor panel of car body define the upper bounds of said space.

16. A front wheel suspension as defined in claim 15, wherein each of said left and right gussets is bolted at its rear end to said reinforcement.

17. A front wheel suspension as defined in claim 15, wherein said stabilizer bar is held to said upper surfaces of said left and right gussets by means of brackets fastened to said left and right gussets within said spaces for twisting motion.

* * * * *